United States Patent
Tesch et al.

(10) Patent No.: US 7,557,530 B2
(45) Date of Patent: Jul. 7, 2009

(54) METHOD, APPARATUS AND ARTICLE FOR DETECTING ROTOR POSITION

(75) Inventors: Tod R. Tesch, Novi, MI (US); Roy I. Davis, Saline, MI (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 188 days.

(21) Appl. No.: 11/250,180

(22) Filed: Oct. 12, 2005

(65) Prior Publication Data

US 2007/0080655 A1 Apr. 12, 2007

(51) Int. Cl.
*H02P 6/00* (2006.01)

(52) U.S. Cl. .................. 318/700; 318/773; 318/799; 318/400.15; 318/432; 318/437

(58) Field of Classification Search .............. 318/432, 318/700, 705, 808, 809, 715, 254, 138, 652, 318/400.15, 799, 823, 433, 437, 704, 727, 318/717
See application file for complete search history.

(56) References Cited

U.S. PATENT DOCUMENTS

| | | | | |
|---|---|---|---|---|
| 5,144,564 | A * | 9/1992 | Naidu et al. ............... | 318/721 |
| 5,903,129 | A | 5/1999 | Okuno et al. ............... | 318/721 |
| 6,002,234 | A * | 12/1999 | Ohm et al. .................. | 318/729 |
| 6,005,364 | A * | 12/1999 | Acarnley .................... | 318/632 |
| 6,163,127 | A * | 12/2000 | Patel et al. .................. | 318/700 |
| 6,339,308 | B2 * | 1/2002 | Shinnaka .................... | 318/701 |
| 6,518,718 | B2 * | 2/2003 | Koga et al. .................. | 318/38 |
| 6,646,409 | B2 * | 11/2003 | Won et al. .................. | 318/701 |
| 6,696,812 | B2 * | 2/2004 | Kaneko et al. .............. | 318/700 |
| 6,700,342 | B2 | 3/2004 | Hampo et al. ............... | 318/432 |
| 6,724,168 | B2 * | 4/2004 | Cheong et al. .............. | 318/701 |
| 6,756,757 | B2 * | 6/2004 | Marcinkiewicz et al. .... | 318/432 |
| 6,801,011 | B2 * | 10/2004 | Ide ............................. | 318/700 |
| 6,822,417 | B2 * | 11/2004 | Kawaji et al. ............... | 318/701 |
| 6,844,701 | B2 | 1/2005 | Chen et al. .................. | 318/825 |
| 6,894,450 | B2 | 5/2005 | Cheng et al. ................ | 318/254 |
| 6,936,991 | B2 | 8/2005 | Chen et al. .................. | 318/700 |
| 7,064,504 | B2 * | 6/2006 | Imai et al. ............. | 318/400.04 |
| 7,071,651 | B2 * | 7/2006 | Toyozawa et al. ........... | 318/807 |
| 7,138,777 | B2 * | 11/2006 | Won et al. .................. | 318/254 |
| 7,211,984 | B2 * | 5/2007 | Patel et al. .................. | 318/778 |
| 2002/0113569 | A1 * | 8/2002 | Iijima et al. ................. | 318/727 |
| 2004/0046519 | A1 * | 3/2004 | Leonardi et al. ............ | 318/432 |
| 2004/0051495 | A1 * | 3/2004 | Kaneko et al. .............. | 318/807 |

OTHER PUBLICATIONS

Morimoto, S., et al., "Sensorless Control Strategy for Salient-Pole PMSM Based on Extended EMF in Rotating Reference Frame", *IEEE Transactions on Industry Applications*, 38(4):1054-1061, Jul./Aug. 2002.

Schmidt, P., et al., "Initial Rotor Angle Detection of a Non-Salient Pole Permanent Magnet Synchronous Machine," in *IEEE Industry Applications Society Annual Meeting*, New Orleans, LA, Oct. 5-9, 1997, http://www.ab.com/drives/techpapers/ieee/10_3.pdf.

* cited by examiner

*Primary Examiner*—Bentsu Ro
*Assistant Examiner*—Antony M Paul

(57) ABSTRACT

A system, method and article for detecting a polarity of a rotor in a motor and/or a generator. In one embodiment, a rotor polarity detection signal is applied and a response thereto is evaluated to determine whether an estimated position of the rotor is correct.

34 Claims, 10 Drawing Sheets

METHOD, APPARATUS AND ARTICLE FOR DETECTING ROTOR POSITION

BACKGROUND OF THE INVENTION

1. Field of the Invention

This disclosure generally relates to control systems for machines including permanent magnet synchronous motors and/or generators, and more particularly to a system, method and article for detecting the position of a rotor in a machine.

2. Description of the Related Art

The "fuel" powering an alternating current machine, such as a field-oriented permanent magnet synchronous motor, is current. This current may be divided into two components, torque current and flux current. Torque current, $I_q$, may be viewed as that component of the current that generates motive force, or torque. Flux current, $I_d$, may be viewed as that component of the current that generates magnetic flux in the rotor of the machine. In a permanent magnet synchronous machine, $I_d$ may be viewed as the flux and reluctance torque current. Torque and flux currents in induction motors are discussed in more detail in U.S. Pat. No. 6,936,991, issued Aug. 30, 2005 and entitled "METHOD AND APPARATUS FOR MOTOR CONTROL," which is incorporated herein by reference in its entirety.

Alternating current machines, such as permanent magnet motors and/or generators, are often employed in electric and hybrid vehicles, which typically employ batteries and/or fuel cells as a power source and/or energy storage system. Current is transferred between the windings of the machine and the energy storage or supply system through a power subsystem, typically comprising an inverter and/or a rectifier. Power subsystems typically employ power semiconductor devices, such as insulated gate bipolar transistors (IGBTs), metal oxide semiconductor field effect transistors (MOSFETs), and/or semiconductor diodes.

Efficient operation of the machine as either a motor or a generator depends, among other things, upon accurate measurements or estimates of the position, speed and rotational direction of the rotor with respect to the stator of the machine. Some machines employ optical or mechanical encoders to detect the position and speed of the rotor. Such encoders are expensive and not always reliable. Other, so called "sensorless" machines, measure various voltages and currents to estimate the position, speed and rotational direction of the rotor with respect to the stator without using encoders. See, for example, U.S. Pat. No. 6,700,342, issued on Mar. 2, 2004 and entitled "METHOD AND APPARATUS FOR HIGH PERFORMANCE PERMANENT MAGNET MOTOR SPEED CONTROL WITH LIMITED POSITION INFORMATION." Some machines may combine encoder data with other data to generate appropriate feedback signals. Alternating current machines sometimes have difficulty determining the correct position of the magnetic poles of the rotor. The differences in currents between the north and south poles of a rotor can be small and difficult to detect. Thus, for example, an estimated position of the rotor is often off by 180 degrees. At the same time, application of large voltages is often required to detect the polarity of the rotor, which leads to large currents. Accordingly, it can be appreciated that an improved method, apparatus and article for detecting the position of the poles of a rotor with respect to a stator is desirable.

BRIEF SUMMARY OF THE INVENTION

In one embodiment, a system, method and article detects a polarity of a rotor in a motor and/or a generator. In one embodiment, a rotor polarity detection signal is applied and a response thereto is evaluated to determine whether an estimated position of the rotor is correct.

In one embodiment, a system comprises a sensor to sense data indicative of a rotor position, and a rotor position estimator communicatively coupled to the sensor and configured to receive a first set of data indicative of a position of a rotor from the sensor, generate a rotor position detection signal, receive a second set of data indicative of the position of the rotor from the sensor, and determine a polarity of the rotor based at least in part on the first and second sets of data. In one embodiment, the rotor position detection signal comprises a torque command pulse. In one embodiment, the torque command pulse comprises a positive torque command pulse. In one embodiment, the rotor position detection signal comprises a periodic signal. In one embodiment, the rotor position detection signal comprises a sinusoidal signal. In one embodiment, the rotor position detection signal comprises a plurality of torque command pulses.

In one embodiment, the rotor position estimator is configured to determine the polarity of the rotor by determining a direction of movement of the rotor in response to the rotor position detection signal based at least in part on the first and second sets of data. In one embodiment, the sensor is configured to sense a current. In one embodiment, the sensor is configured to sense a voltage. In one embodiment, the rotor position estimator comprises a lookup table. In one embodiment, the rotor position estimator comprises a feedback loop.

In one embodiment, an alternating current machine comprises a rotor, a stator, means for sensing, and means for controlling the alternating current machine comprising means for generating torque current control signals, means for generating flux current control signals, and means for estimating a position of the rotor with respect to the stator comprising means for verifying a polarity of the rotor. In one embodiment, the means for sensing is configured to sense an indication of an angular position of the rotor with respect to the stator. In one embodiment, the means for verifying a polarity of the rotor is configured to determine the polarity of the rotor by determining a direction of movement of the rotor in response to the polarity detection signal. In one embodiment, the means for verifying a polarity of the rotor comprises a feedback loop. In one embodiment, the means for verifying a polarity of the rotor comprises a lookup table.

In one embodiment, a method of determining a polarity of a rotor in an alternating current machine comprises estimating a position of the rotor, applying a rotor polarity detection signal, sensing data indicative of a response to the rotor polarity detection signal, and determining a polarity of the rotor based at least in part on the sensed data indicative of a response to the rotor polarity detection signal. In one embodiment, sensing data indicative of a response to the rotor polarity detection signal comprises sensing data indicative of a direction of movement of the rotor. In one embodiment, sensing data indicative of a response to the rotor polarity detection signal comprises detecting a magnitude of an error signal. In one embodiment, sensing data indicative of a response to the rotor polarity detection signal comprises detecting a frequency and magnitude of an error signal. In one embodiment, the method further comprises adjusting the estimated position of the rotor based at least in part on the determined polarity of the rotor. In one embodiment, adjusting the estimated position of the rotor comprises adding a position offset to the estimated position of the rotor.

In one embodiment, a computer-readable medium stores instructions for causing a control system to determine a polarity of a rotor by estimating a position of the rotor, applying a rotor polarity detection signal, sensing data indicative of a response to the rotor polarity detection signal, and determining a polarity of the rotor based at least in part on the sensed data indicative of a response to the rotor polarity detection signal. In one embodiment, the stored instructions further cause the control system to adjust the estimated position of the rotor based at least in part on the determined polarity of the rotor.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of various embodiments. However, one skilled in the art will understand that the present systems and methods may be practiced without these details. In other instances, well-known structures associated with power subsystems, bus systems, controllers, gate drivers, encoders, permanent magnet generators/motors and/or alternating current machines have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the claims or of the disclosure.

Figure 1A:
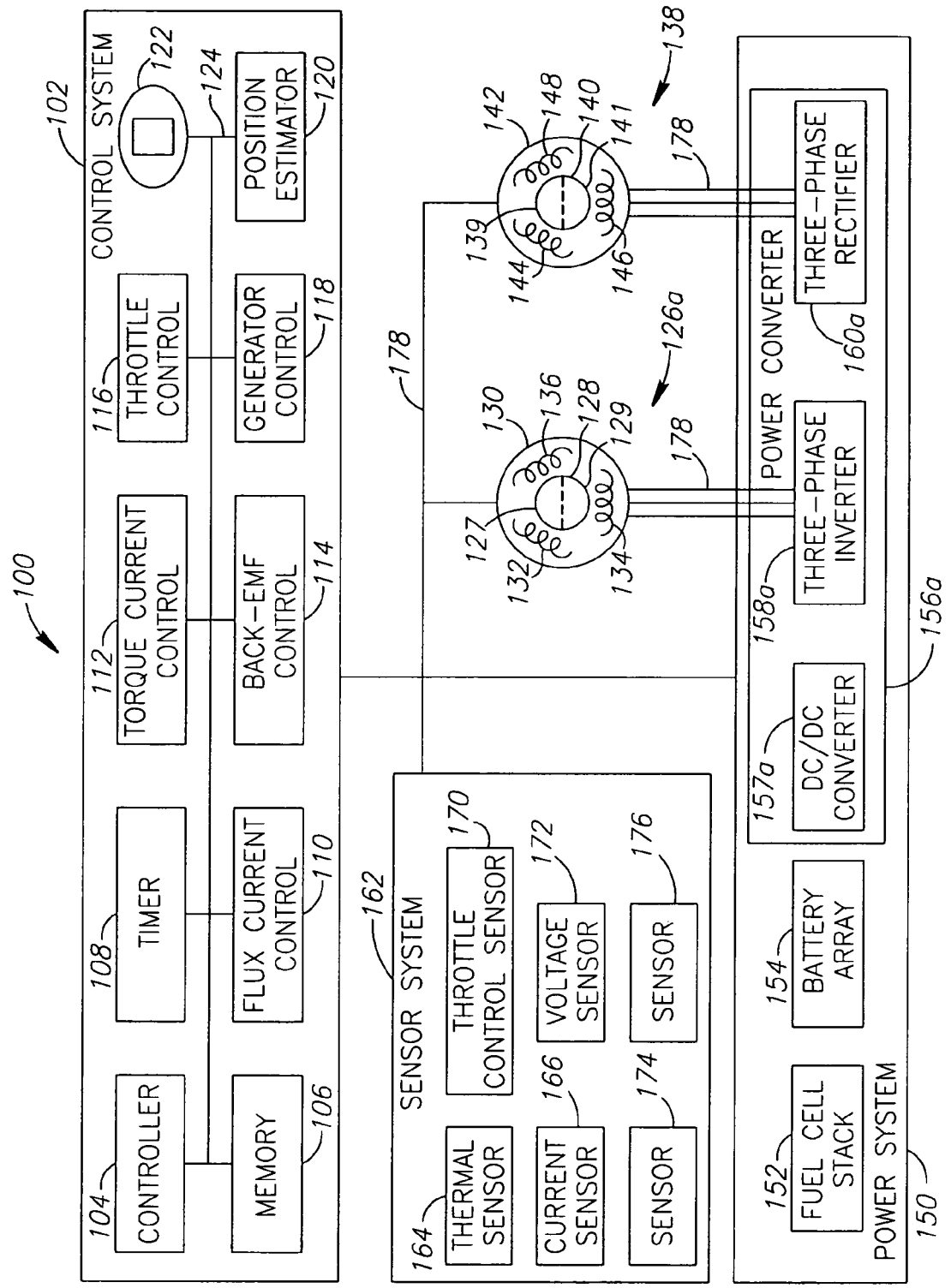
FIG. 1A is a schematic diagram of system including an electric motor, an electric generator, a power system, a sensor system and a control system according to at least one illustrated embodiment.

FIG. 1A is a functional block diagram of a system 100 implementing an embodiment of rotor position detection according to the present methods, apparatus and articles. The system 100 may be embodied in an alternating current machine, such as an electric traction motor of an electric and/or hybrid motor vehicle, which may be operable to perform regenerative braking.

The system 100 comprises a control system 102, which controls operation of the system 100. The control system 102 may take the form of one or more processors, microcontrollers, firmware, subsystems, or other circuitry and components or combinations thereof, with or without associated memory.

In the embodiment illustrated in FIG. 1A, the control system 102 comprises a controller 104, a memory 106, a timer 108, a flux current control 110, a torque current control 112, a back-EMF control 114, a throttle control 116, a generator control 118, a rotor position estimator 120, a switch, for example, a keyed switch 122, and a control system bus 124. The control system bus 124 may comprise a power bus, control bus, and status signal bus in addition to a data bus. For the sake of clarity, however, the various control system buses are illustrated in FIG. 1A as the control system bus 124.

The control system 102 may be implemented in a variety of ways, including as separate subsystems. The control system 102 may be implemented as a microprocessor, a digital signal processor (DSP), an application-specific integrated circuit (ASIC), a gate-driver board, or the like, or as a series of instructions stored in a memory, such as the memory 106 and executed by a controller, such as the controller 104, or various combinations of the above. Thus, software modifications to existing hardware may allow the implementation of the control system 102. Various subsystems, such as the rotor position estimator 120, are identified as separate blocks in the functional block diagram of FIG. 1A because they perform specific functions that will be described in more detail below. These subsystems may be discrete units. For example, the rotor position estimator 120 may be implemented with a discrete circuit. The subsystems also may not be discrete units but may be functions of a software routine, which will probably, but not necessarily, be separately callable and hence identifiable elements. The various subsystems may be combined. For example, all or portions of the rotor position estimator 120 may be integrated into the torque current control 112.

While the illustrated embodiment denotes a single controller 104, other embodiments may comprise multiple controllers. The memory 106 may comprise, for example, registers, read only memory ("ROM"), random access memory ("RAM"), flash memory and/or electronically erasable programmable read only memory ("EEPROM"), and may provide instructions and data for use by the control system 102.

The illustrated embodiment of the system 100 comprises an AC motor 126a comprising a rotor 128 and a stator 130. The rotor 128 comprises one or more permanent magnets (not shown) that create a first rotor pole 127 and a second rotor pole 129. In some embodiments, the rotor 128 may have multiple pairs of poles. The stator 130 comprises three windings 132, 134, 136. The motor 126a as illustrated comprises a permanent magnet synchronous motor.

The system 100 also comprises an optional generator 138 comprising a rotor 140 and a stator 142. The rotor 140 comprises one or more permanent magnets (not shown) that create a first rotor pole 139 and a second rotor pole 141. In some embodiments, the rotor 140 may have multiple pairs of poles. The stator 142 comprises three windings 144, 146, 148. The generator 138 as illustrated comprises a permanent magnet synchronous generator. In some embodiment, the generator 138 may be omitted. In other embodiments, the motor may be configured to operate as a motor in one mode of operation and as a generator in another mode of operation (see motor 126b in FIG. 1B).

The illustrated embodiment of the system 100 comprises a power system 150 comprising a power source, for example, fuel cell stack 152, a power storage device, for example, battery array 154 and a power converter 156a. As illustrated, the power converter 156a comprises a DC/DC converter 157a, a three-phase inverter 158a electrically coupled to the DC/DC converter 157a and to the motor 126a, and a three-phase rectifier 160a electrically coupled to the generator 138 and to the DC/DC converter 157a. The power system 150 provides power to the system 100.

The flux current control 110 and the torque current control 112 generate control signals to control flux and torque currents, respectively, provided to the windings 132, 134, 136 by the power system 150. The generator control 118 generates control signals to control operation of the generator 138.

The illustrated embodiment of the system 100 comprises a sensor system 162 comprising a thermal sensor 164, a current sensor 166, a throttle control sensor 170, a voltage sensor 172 and additional sensors 174, 176. The sensor system 162 senses various conditions of the system 100, such as temperatures inside and/or outside the power system 150 and/or the windings 132, 134, 136, 144, 146, 148, position and angular movement of the rotors 128, 140, or levels of various control signals, such as levels of control signals generated by the torque current control 112, the throttle control 116, or the power system 150. The exact components and configuration of the sensor system 162 may vary based on the particular application. For example, the sensor system 162 may have more than one thermal sensor, instead of one thermal sensor as illustrated. The additional sensors 174, 176, may comprise, for example, one or more encoders. The memory 106 may store a history of data collected by the sensor system 162. The data collected by the sensor system 162 comprises data indicative of the position and of the speed and direction of movement of the rotor 128 with respect to the stator 130 of the motor 126a. The data indicative of the position and of the speed and direction of movement of the rotor 128 with respect to the stator 130 of the motor 126a, may comprise, for example, data from the voltage sensor 172, and/or data from the current sensor 166.

As discussed in more detail below, the position estimator 120 estimates a position θ of the rotor 128 with respect to the stator 130. Various components of the system 100 are coupled together by a bus system 178 which may include a power bus, control bus, status signal bus and a data bus. The bus system 178 may comprise an industry standard bus system, such as a controller area network ("CAN"). For the sake of clarity, however, the various buses are illustrated in FIG. 1A as the bus system 178. In addition, various internal buses, such as buses within the power system 150 and the sensor system 162, are omitted from FIG. 1A to facilitate clarity.

In normal operation of the motor 126a, the control system 102 generates control signals that cause the power system 150 to supply torque and flux currents to the windings 132, 134, 136 of the motor 126a, which allows the control system 102 to control the movement and/or the torque of the rotor 128 with respect to the stator 130. Normally, the control system 102 controls the relationship between the flux current and the torque current so as to maximize the torque produced and/or the efficiency of an alternating current machine, such as the motor 126a illustrated in FIG. 1A.

Figure 1B:
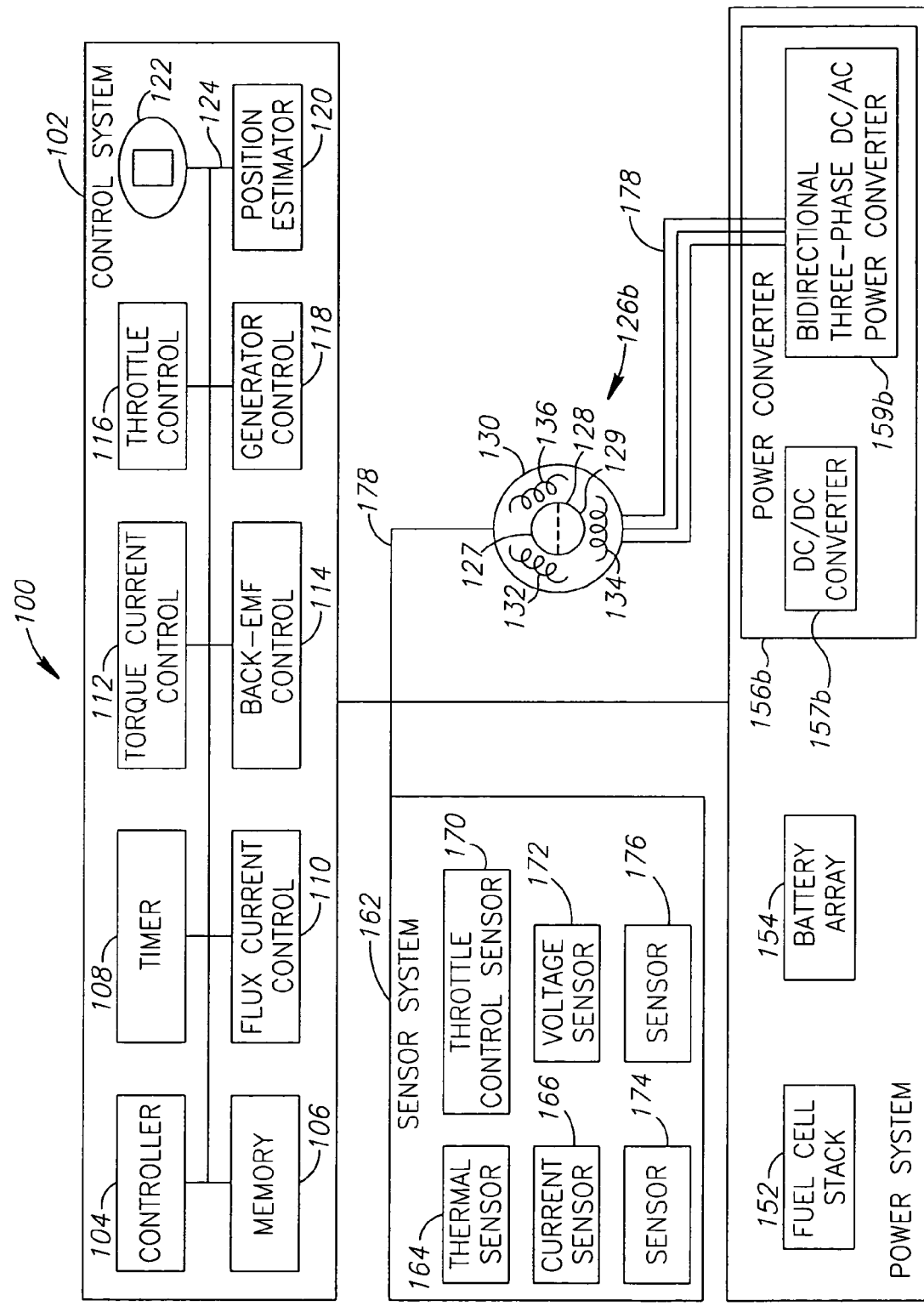
FIG. 1B is a schematic diagram of a system including an electric motor, a power system, a sensor system and a control system according to at least one illustrated embodiment.

FIG. 1B is a functional block diagram of another system 100 implementing an embodiment of rotor position detection according to the present methods, apparatus and articles. In the embodiment illustrated in FIG. 1B, the optional generator (see generator 138 of FIG. 1A) is omitted. The motor 126b is configured to operate as a motor in one mode of operation (e.g., driving) and as a generator in another mode of operation (e.g., regenerative breaking). The power converter 156b comprises a DC/DC converter 157b and a bidirectional three-phase DC/AC power converter 159b, instead of a three-phase inverter (see three-phase inverter 158a of FIG. 1A) and a three-phase rectifier (see three-phase rectifier 160a of FIG. 1A).

The various components and subsystems of the system 100 illustrated in FIGS. 1A and 1B may, in alternative embodiments have alternative configurations, may contain additional components, and/or may not contain all of the components and subsystems identified. For example, the timer 108 may be a separate component of the system 100, instead of being part of the control system 102, and may be implemented as a series of software instructions. In another example embodiment, the back-EMF control 114 may be considered part of the power system 150.

Figure 2:
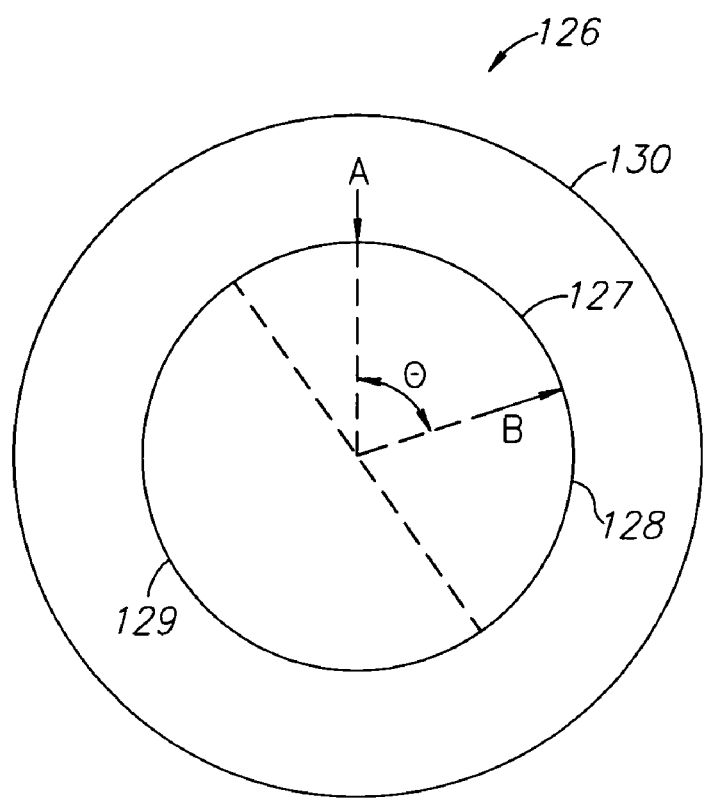
FIG. 2 is a side plan view of an electric motor suitable for use in the embodiments of FIGS. 1A and 1B and illustrating a position θ of a rotor with respect to a stator.

FIG. 2 is a top plan view of a motor 126, suitable for use in the embodiments illustrated in FIGS. 1A and 1B. The relative position a of the rotor 128 with respect to the stator 130 can be viewed as an angle θ between a reference point A on the stator 130 and a reference point B on the rotor 128, as illustrated in FIG. 2. The position estimator 120 estimates the position θ of the rotor 128 based on measurements or estimates of various conditions of the system 100, or based on a combination of measurements and estimates of various conditions of the system 100. For example, the position θ of the rotor 128 may be measured by using a sensor such as an encoder or a plurality of encoders. In another example, the position θ of the rotor 128 can be estimated based upon the torque and flux voltages applied to the windings 132, 134, 136 of motor and the torque and flux currents conducted through the windings 132, 134, 136. See U.S. Pat. No. 6,700,342, issued on Mar. 2, 2004 to Hampo, et al. and entitled "Method and Apparatus for High Performance Permanent Magnet Motor Speed Control With Limited Position Information." See also, Morimoto, et al., *Sensorless control strategy for salient-pole PMSM based EMF in rotating reference frame*, IEEE Transactions on Industry Applications, Vol. 38, Issue 4, pp. 1054-1061(2002). In many so-called sensorless systems, voltages and currents are measured to determine an estimated back-EMF and/or an estimated position of a rotor, such as the estimated position θ of the rotor 128 illustrated in FIG. 2.

The position may be estimated, for example, based on current feedback, including back-emf estimation and signal injection techniques. The position estimator 120 may employ a look-up table to determine the position θ of the rotor 128. The position θ of the rotor 128, or an indication of the position θ of the rotor 128, can be used to determine the estimated torque back-EMF $\omega_e \lambda_{pmqe}(\theta)$, and/or to generate appropriate control signals for controlling the alternating current machine. Multiple look-up tables or a single look-up table may be employed when determining the position θ of the rotor 128 based upon one or more control signals, control variables, and/or sensor measurements. The look-up table can be populated by measuring the characteristics of the motor 126. The data used to populate the table may be based on characteristics for a class of motors (i.e., for a particular motor design) or may be unique to a particular motor and/or application.

Figure 3:
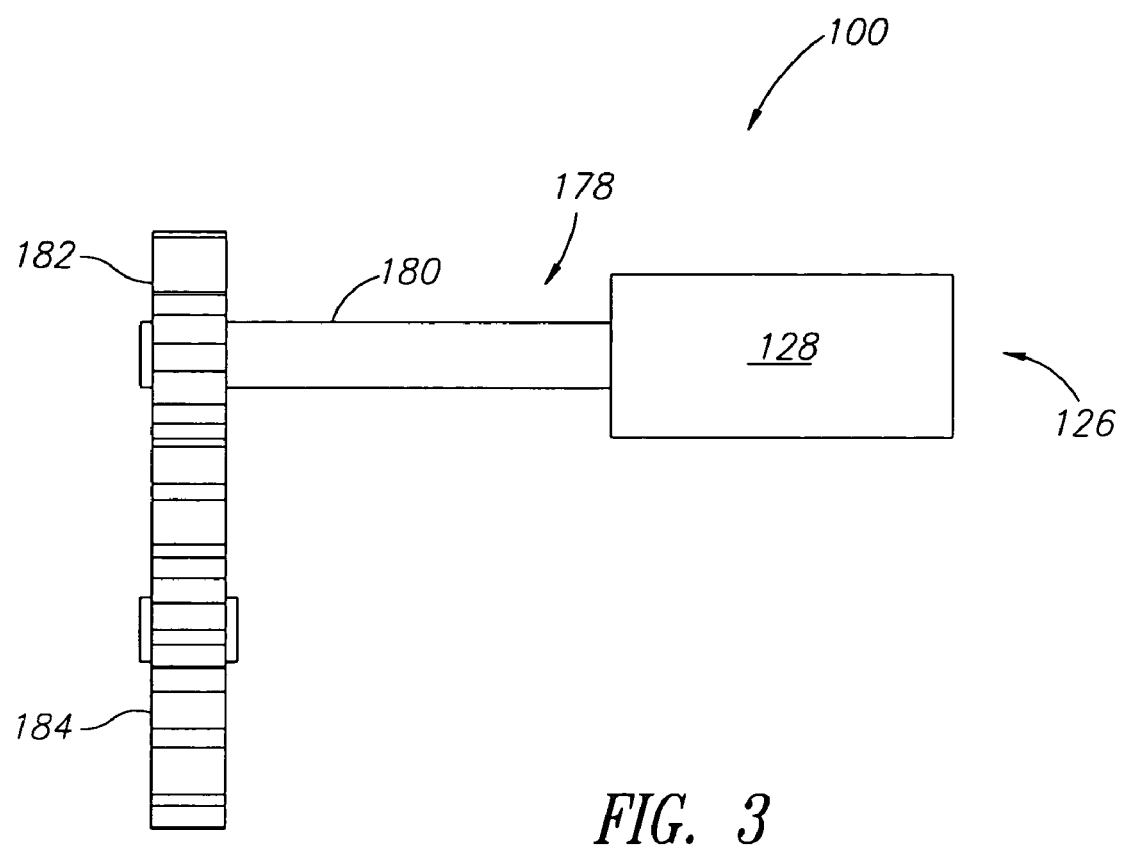
FIG. 3 is a side plan view of a drive train suitable for use in the embodiments of FIGS. 1A and 1B.
Figure 4:
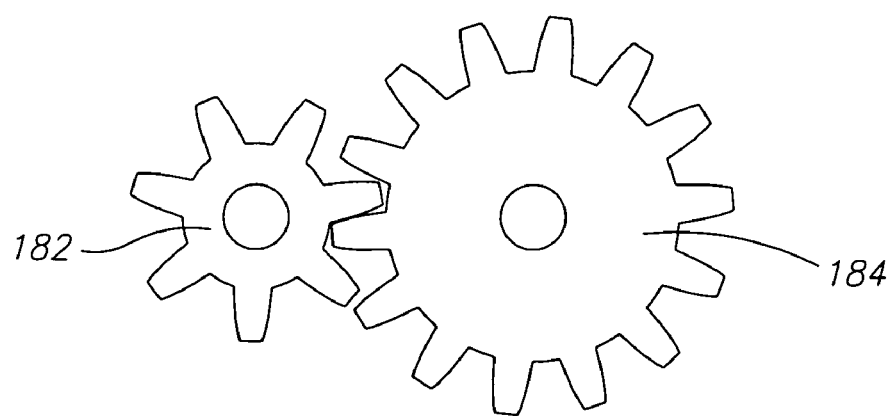
FIG. 4 is a side plan view illustrating the engagement of the drive gear 182 and the driven gear 184 of FIG. 3.

FIG. 3 is a side plan view of a drive train 178 of a motor 126 suitable for use in the embodiments of an alternating current machine 100 illustrated in FIGS. 1A and 1B. Portions of the motor 126 are omitted from FIG. 3 for ease of illustration. As illustrated, the rotor 128 is mounted on a drive shaft 180. In some embodiments, the rotor 128 may be integrated into the drive shaft 180. A drive gear 182 also is mounted on the drive shaft 180. The drive gear 182 engages a driven gear 184. FIG. 4 is a side plan view illustrating the engagement of the drive gear 182 and the driven gear 184 of FIG. 3. In some embodiments, the drive train 178 may be more complicated than the illustrated gear set. For example, in some embodiments the drive train 178 may employ a differential and a transmission (not shown).

In normal operation, the torque currents applied to the motor 126 cause the rotor 128 to rotate, which in turn causes the drive shaft 180 and the drive gear 182 to rotate. The drive gear 182 engages the driven gear 184, causing the driven gear 184 to rotate, driving the alternating current machine 100. The drive train 178 has some mechanical play based on the interaction of the drive gear 182 and the driven gear 184. For example, as illustrated the drive gear 182 may rotate slightly in either direction before the driven gear 184 will rotate is response thereto. Other embodiments of drive trains, such as other gear-driven drive trains, belt-driven drive trains, drive trains employing a differential and transmission, and/or combination drive trains, will typically have some amount of mechanical play.

Figure 5:
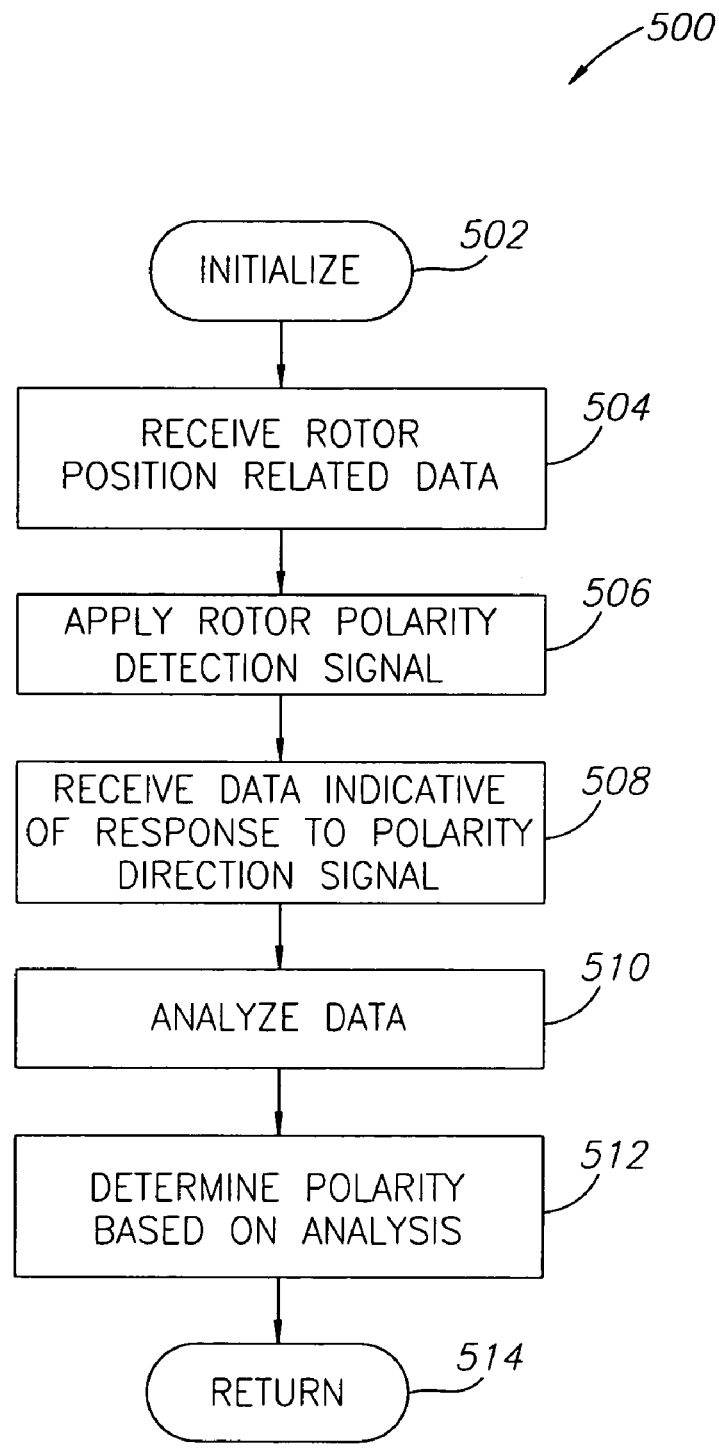
FIG. 5 is a high-level control diagram illustrating a method of estimating a position θ of a rotor according to an illustrated embodiment.

FIG. 5 is a high-level control diagram for one embodiment of a subroutine 500 that may be employed by a control system of an alternating current machine, such as the control system 102 of the alternating current machine 100 illustrated in FIG. 1A or the control system 102 of the alternating current machine 100 illustrated in FIG. 1B, to detect the position θ of a rotor, such as the rotor 128.

The control system 102 initializes the subroutine 500 at 502. The subroutine 500 proceeds to 504. At 504, the control system 102 receives initial data indicative of the position θ of the rotor 128. This can be done, for example, based on the voltages applied to the windings 132, 134, 136 of the motor 126 and the torque and flux currents conducted through the windings 132, 134, 136 of the motor 126. This data may be measured or estimated based on control signals, or a combination thereof. The data indicative of the position θ of the rotor can be used to estimate the position θ of the rotor 128, which usually will include or incorporate by implication an estimate of the polarity of the rotor. The data itself may comprise an estimated or measured position θ of the rotor. The position θ of the rotor may be a fixed value or may be expressed as a function. For example, the position θ of the rotor may be a fixed value if the alternating current machine is stationary, and may be expressed as a function of time and/or other variables, if the alternating current machine is moving.

The subroutine 500 proceeds to 506. At 506, the control system 102 applies a rotor polarity detection signal to the motor 126. As discussed in more detail below, the rotor polarity detection signal may be a rotor polarity verification signal. The rotor polarity detection signal may take the form of, for example, a torque command pulse, a series of torque command pulses, or a continuous signal, such as a square-wave excitation signal or a sinusoidal excitation signal.

The subroutine 500 proceeds to 508. At 508, the control system 102 receives data indicative of a response to the rotor polarity detection signal. For example, the control system 102 may receive data indicative of a new position θ of the rotor 128. The data indicative of the position θ of the rotor can be used to estimate the position θ of the rotor 128, which may, or may not, include an estimate of the polarity of the rotor. The data may comprise an estimated position θ of the rotor. In another example, the control system 102 may receive data indicative of the magnitude and frequency of a feedback signal.

The subroutine 500 proceeds to 510. At 510 the control system 102 analyzes the received data. For example, the control system 102 may compare the initial data indicative of the position θ of the rotor to new data indicative of the position θ of the rotor. In some embodiments, the control system may compare an initial estimated position θ of the rotor with a new estimated position θ of the rotor. In another example, the control system 102 may analyze the data to determine a magnitude and or frequency of a feedback signal.

The subroutine 500 proceeds to 512. At 512, the control system 102 determines the polarity of the rotor based at least in part on the analysis. The polarity may be determined, for example, by determining a direction of movement of the rotor based on a comparison of the initial data indicative of the position of the rotor and the new data indicative of the position of the rotor. In another example, the polarity may be determined based on a magnitude and/or frequency of a feedback signal. The subroutine 500 proceeds to 514. At 514 the control system 102 returns the value of any desired variables, such as the position and/or polarity of the rotor.

Embodiments of a subroutine to detect the position of a rotor may perform other acts not shown in FIG. 5, may not all perform all of the acts shown in FIG. 5, or may perform the acts of FIG. 5 in a different order. For example, the subroutine 500 may be modified to include applying an additional rotor polarity detection signal and to receive and compare additional sets of data.

Figure 6:
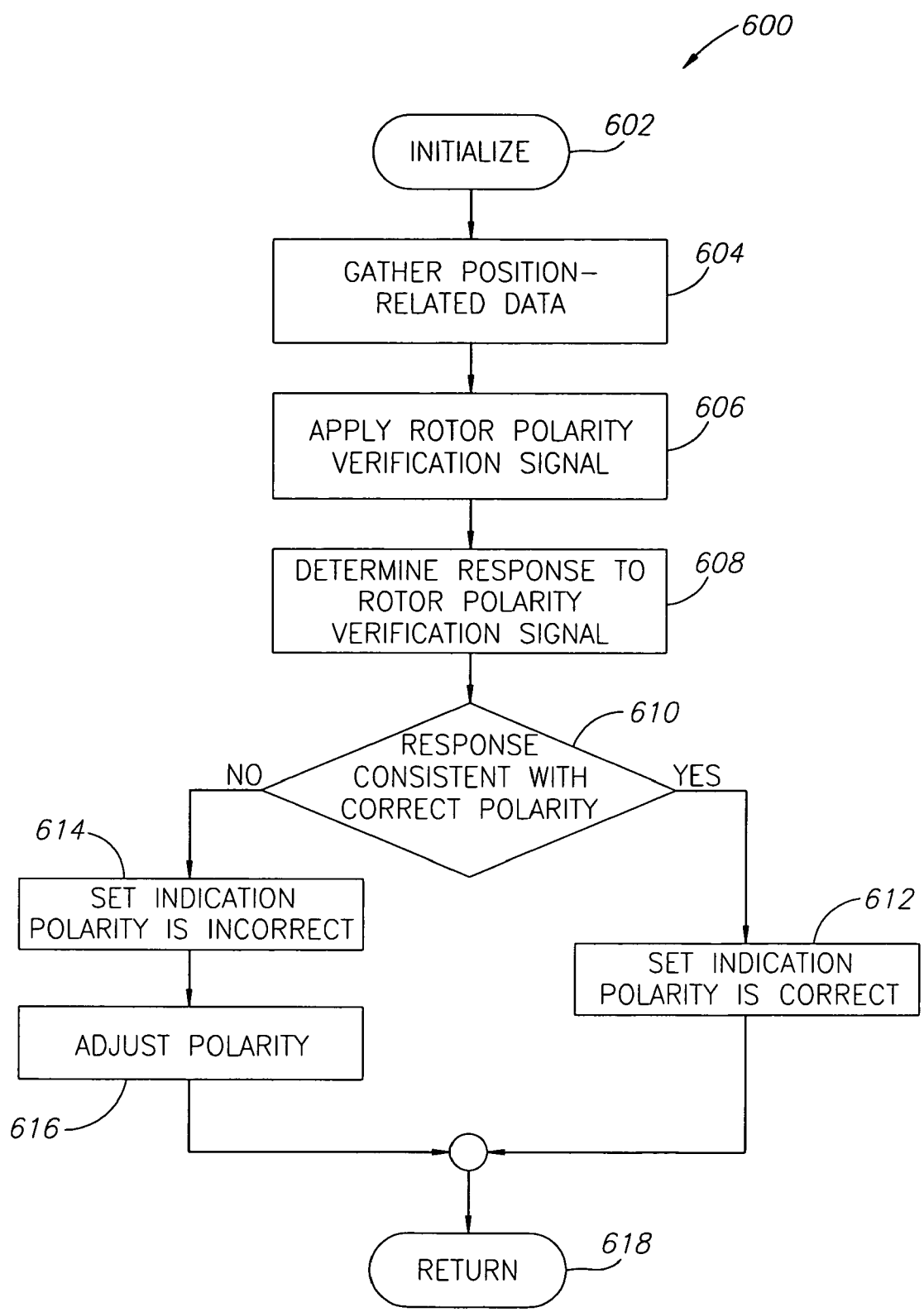
FIG. 6 is a high-level control diagram illustrating a method of estimating a position θ of a rotor according to an illustrated embodiment.

FIG. 6 is a high-level control diagram for one embodiment of a subroutine 600 that may be employed by a control system of an alternating current machine, such as the control system 102 of the alternating current machine 100 illustrated in FIG. 1A or the control system 102 of the alternating current machine 100 illustrated in FIG. 1B, to detect the position θ of a rotor, such as the rotor 128. The embodiment illustrated in FIG. 6 may be advantageously employed to verify an estimated or assumed polarity of a rotor.

The control system 102 initializes the subroutine 600 at 602. The subroutine 600 proceeds to 604. At 604, the control system 102 gathers data indicative of the position of the rotor 128. This can be done, for example, based on voltages applied to the windings 132, 134, 136 of the motor 126 and the torque and flux currents conducted through the windings 132, 134, 136 of the motor 126. The data can be used to estimate the position of the rotor 128. The estimated position of the rotor 128 includes an estimated or an assumed or default polarity of the rotor.

The subroutine 600 proceeds to 606. At 606, the control system 102 applies a rotor polarity verification signal to the motor 126. As discussed in more detail below, the rotor polarity verification signal may take, for example, the form of a torque command pulse, a series of torque command pulses, or a continuous signal, such as a square-wave excitation signal or a sinusoidal excitation signal.

The subroutine 600 proceeds to 608. At 608, the control system 102 determines the response to the rotor polarity verification signal, such as an impact on the data indicative of the position of the rotor 128. The subroutine 600 proceeds to 610. At 610 the control system 102 determines whether the response to the rotor polarity verification signal is consistent with a correct polarity of the rotor 128.

If it is determined that the response to the rotor polarity verification signal is consistent with a correct polarity of the rotor 128, the subroutine proceeds to 612. At 612, the control system 102 sets an indication that the polarity of the rotor 128 is correct. The subroutine 600 proceeds from 612 to 618. At 618 the control system 102 returns the value of any desired variables, such as the data indicative of the position of the rotor and/or any indication regarding the polarity of the rotor.

If it is determined that the response to the rotor polarity verification signal is inconsistent with a correct polarity of the rotor, the subroutine 600 proceeds to 614. At 614, the control system 102 sets an indication that the polarity of the rotor 128 is incorrect. The subroutine 600 proceeds to 616. At 616 the control system 102 adjusts an estimated position θ of the rotor based on the indication that the polarity of the rotor is incorrect. For example, the control system 102 may respond to an indication that the polarity of the rotor is incorrect by adding a position offset, such as a 180 degree offset, to the estimated position θ of the rotor 128. The subroutine 600 proceeds to 618. At 618, the control system 102 returns the value of any desired variables, such as the data indicative of the position of the rotor and/or any indication regarding the polarity of the rotor.

Embodiments of a subroutine to detect the position of a rotor may perform other acts not shown in FIG. 6, may not all perform all of the acts shown in FIG. 6, or may perform the acts of FIG. 6 in a different order. For example, the subroutine 600 may be modified to include applying an additional rotor polarity verification signal and/or to set an initial assumed polarity of the rotor. The acts described in FIG. 6 may comprise additional acts in some embodiments. For example, in an embodiment act 604 may comprise estimating a position of the rotor 128, act 608 may comprise determining a change in the estimated position of the rotor 128, and act 610 may comprise determining whether the change in the estimated position of the rotor is consistent with a correct polarity of the rotor 128.

Figure 7:
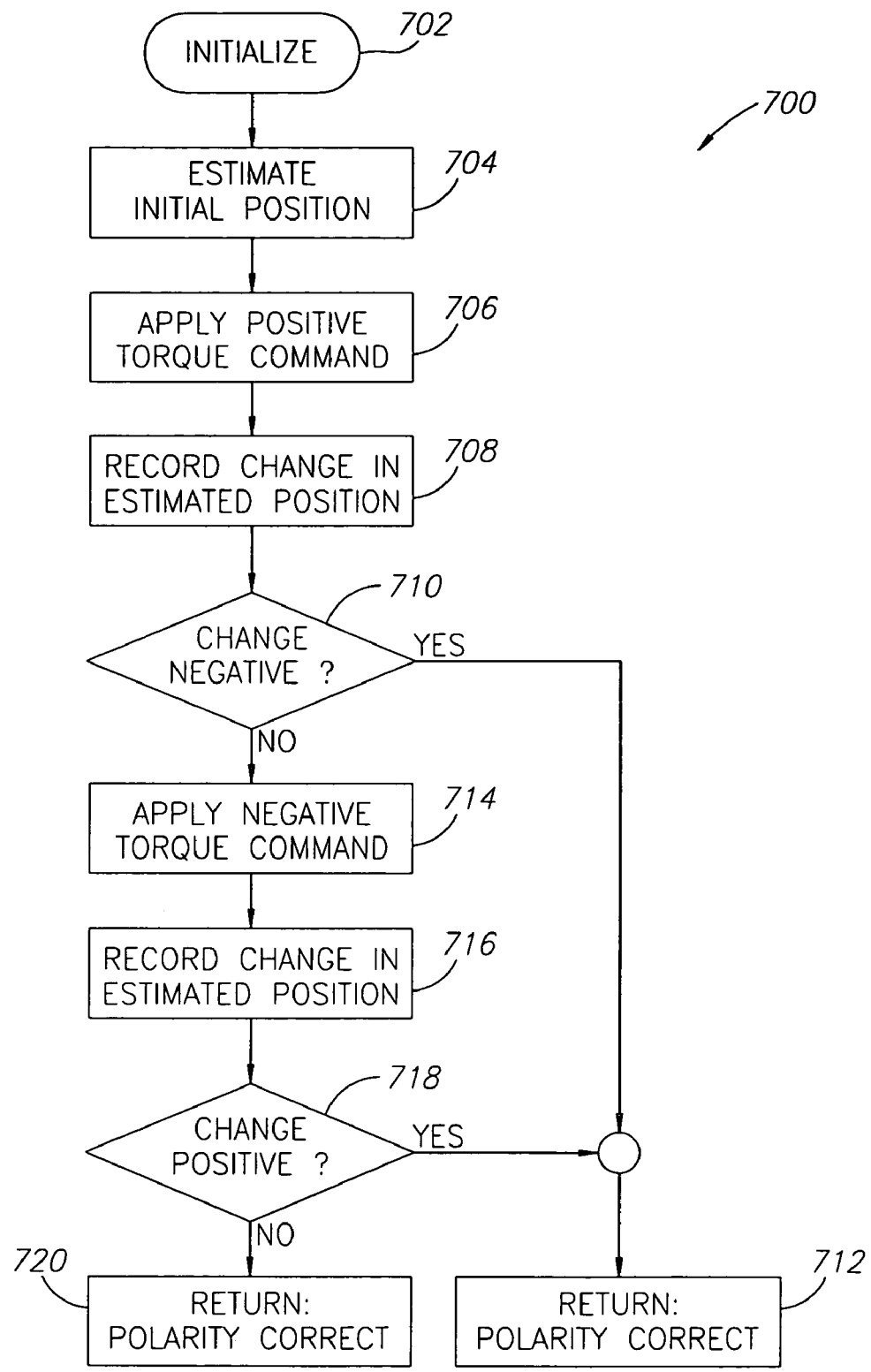
FIG. 7 is a high-level control diagram illustrating a method of determining a polarity of a rotor according to an illustrated embodiment.

FIG. 7 is a high-level control diagram for an embodiment of a subroutine 700 that may be employed by a control system of an alternating current machine, such as the control system 102 of the alternating current machine 100 illustrated in FIG. 1A or the control system 102 of the alternating current machine 100 illustrated in FIG. 1B, to determine whether the polarity of an estimated position θ of a rotor, such as the rotor 128, is correct. The embodiment of a subroutine illustrated in FIG. 7 may take advantage of the mechanical play in the drive train of an alternating current machine, such that, for example, the correct position θ of a rotor in an alternating current machine such as an automobile can be detected without moving the automobile.

The control system 102 initializes the subroutine 700 at 702. The subroutine 700 proceeds to 704. At 704, the control system 102 estimates the initial position of the rotor 128. The position can be estimated, for example, based on the voltages applied to the windings 132, 134, 136 of the motor 126 and the torque and flux currents conducted through the windings 132, 134, 136 of the motor 126. The estimated initial position may include an estimated polarity or an assumed or default polarity of the rotor 128.

The subroutine 700 proceeds to 706. At 706, the control system 102 applies a positive torque command to the motor 126, which may cause the rotor 128 to rotate with respect to the stator 130. The positive torque command may be a pulse of a magnitude sufficient to rotate the rotor 128 within the range of mechanical play of the alternating current machine 100, but insufficient to drive the machine. For example, with respect to FIG. 4, the positive torque command may be sufficient to rotate the drive gear 182 within the range of mechanical play available, but insufficient to overcome the inertia of the driven gear 184.

The subroutine 700 proceeds to 708. At 708, the control system 102 records the estimated change in the position of the rotor 128. The subroutine 700 proceeds to 710. At 710 the control system 102 determines whether the change in the estimated position of the rotor 128 is negative. If the change in the estimated position of the rotor is negative at 710, the subroutine proceeds to 712. At 712, the control system 102 returns an indication that the estimated polarity of the rotor is incorrect, together with any other desired variables. If the change in the estimated position of the rotor is zero or positive at 710, the subroutine proceeds to 714.

At 714, the control system 102 applies a negative torque command to the motor 126, which may cause the rotor 128 to rotate with respect to the stator 130. The negative torque command may be a pulse of a sufficient magnitude so as to rotate the rotor 128 within the range of mechanical play of the alternating current machine 100, but insufficient to drive the machine. For example, with respect to FIG. 4, the negative torque command may be sufficient to rotate the drive gear 182 within the range of mechanical play, but insufficient to overcome the inertia of the driven gear 184. The negative torque command may be, for example, of the opposite magnitude and the same duration as the positive torque command, or may be of a different duration and magnitude than the positive torque command.

The subroutine proceeds from 714 to 716. At 716, the control system 102 records the change in the estimated position θ of the rotor 128. The subroutine proceeds to 718. At 718, the control system 102 determines whether the change in the estimated position of the rotor 128 is positive. If it is determined that the change in the estimated position of the rotor 128 is positive, the subroutine proceeds to 712. At 712, the control system 102 returns an indication that the estimated polarity of the rotor is incorrect, together with any other desired variables. If the change in the estimated position of the rotor is negative at 718, the subroutine proceeds to 720. At 720, the control system 102 returns an indication that the estimated polarity of the rotor is correct, together with any other desired variables.

Embodiments of a subroutine to determine the polarity of a rotor may perform other acts not shown in FIG. 7, may not all perform all of the acts shown in FIG. 7, or may perform the acts of FIG. 7 in a different order. For example, the subroutine 700 may be modified so that a negative torque command is applied before a positive torque command is applied. In another example, the subroutine 700 could be modified to modify the polarity of the estimated position of the rotor at act 712, instead of returning an indication that the polarity is incorrect. In some embodiments, the magnitude of the applied torque commands may be sufficient to cause movement of the machine. For example, in some embodiments the machine may have little or no mechanical play.

Figure 8:
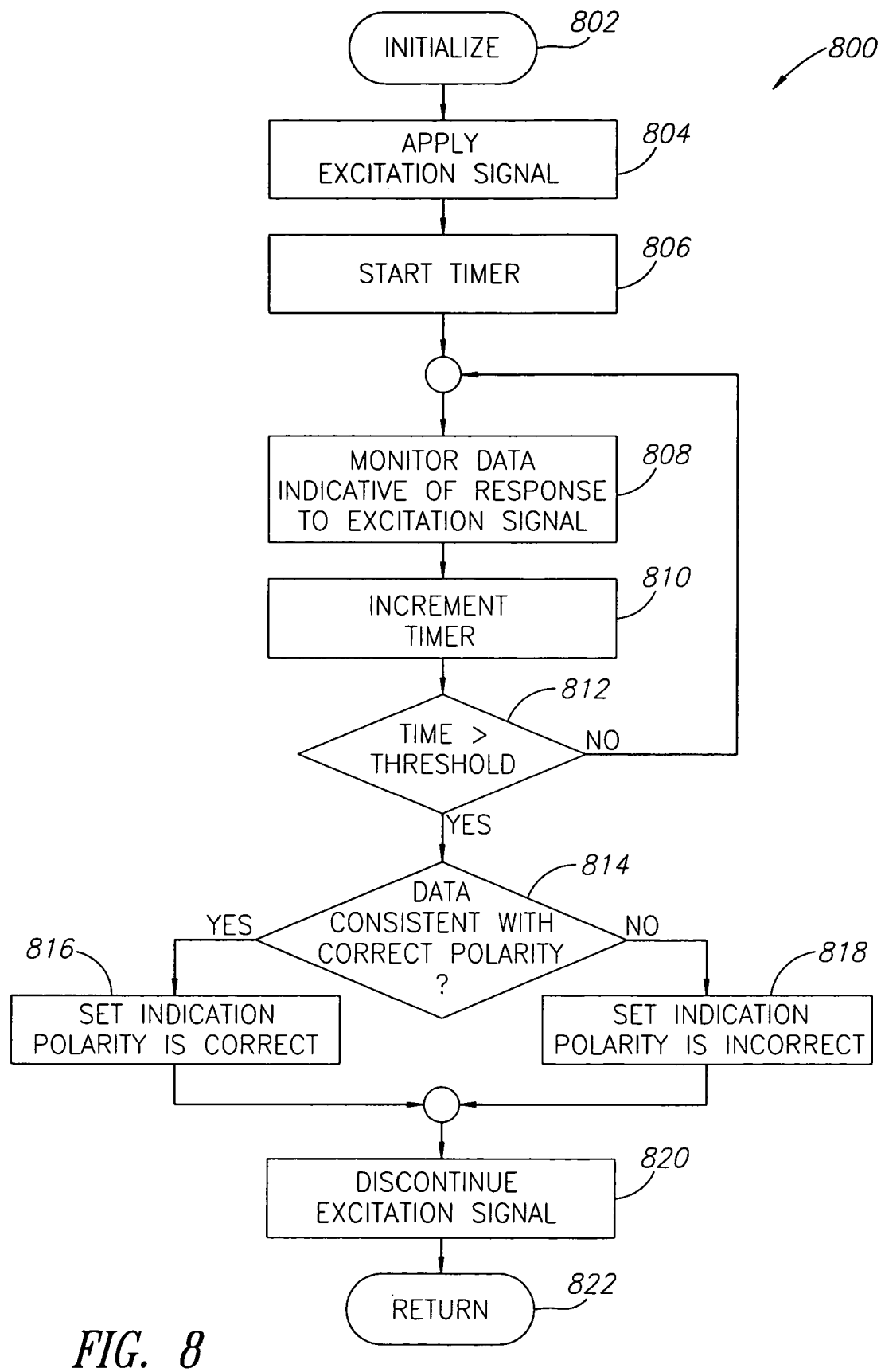
FIG. 8 is a high-level control diagram illustrating a method of determining a polarity of a rotor according to an illustrated embodiment.

FIG. 8 is a high-level control diagram for another embodiment of a subroutine 800 that may be employed by a control system of an alternating current machine, such as the control system 102 of the alternating current machine 100 illustrated in FIG. 1A or the control system 102 of the alternating current machine 100 illustrated in FIG. 1B, to determine whether an estimated position θ of a rotor, such as the rotor 128, has a correct polarity. The embodiment of a subroutine 800 illustrated in FIG. 8 may be advantageously employed to detect an error in the polarity of a rotor, such as the rotor 128, while an alternating current machine is moving. For example, it may be desirable to start an alternating current machine, such as an automobile, while the machine is moving. For example, an automobile may be started while on a hill and slightly rolling in one direction. In another example, a system restart may be desirable while an automobile is in operation. The embodiment of a subroutine 800 illustrated in FIG. 8 may also be employed when an alternating current machine is stationary.

Figure 9:
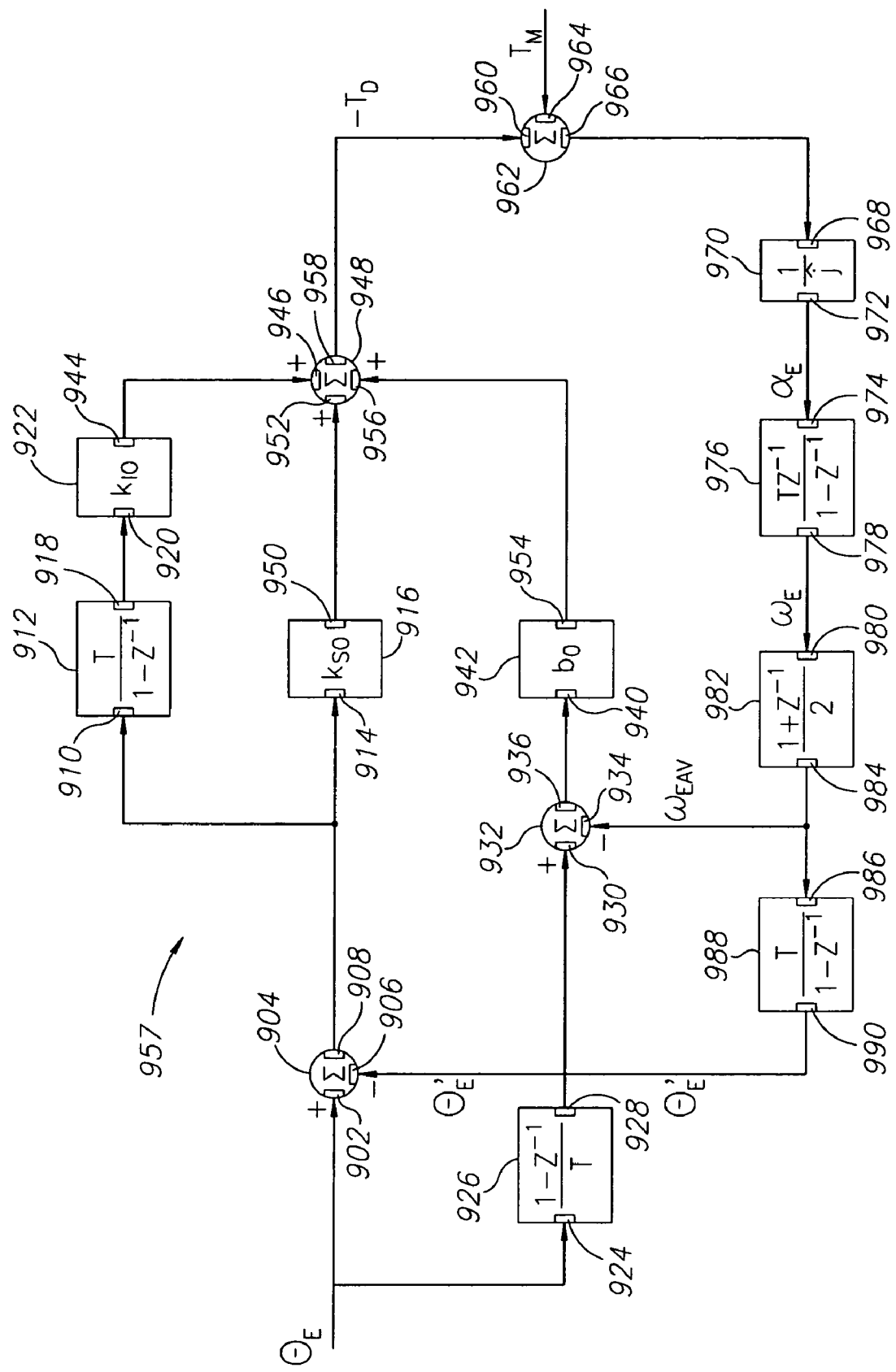
FIG. 9 is a functional block diagram of an embodiment of a system employing a feedback loop according to an illustrated embodiment.

The control system 102 initializes the subroutine 800 at 802. The subroutine 800 proceeds to 804. At 804, the control system 102 applies an excitation signal to the motor 126. The excitation signal may, for example, take the form of a square-wave signal or a sinusoidal signal applied to one or more windings of an alternating current machine, such as the windings 132, 134, 136 of the motor 126a illustrated in FIG. 1A. The excitation signal may be applied alone and/or on top of drive signals generated by the control system 102 to control the operation of the motor. The magnitude and frequency of the excitation signal may, for example, be selected so as to create a detectable feedback signal, such as a ripple current, a change in magnitude of a torque or flux current, or the absence or presence of a signal at a particular frequency, that is predictable based upon the polarity of the rotor, but which does not substantially impact the performance of the alternating current machine. For example, if it is desired not to drive the machine, the excitation signal can be of a magnitude insufficient to overcome the inertia of the machine. Thus, the magnitude and frequency selected for the excitation signal may be a function of the characteristics of the alternating current machine, including the current operating state of the alternating current machine. As illustrated in FIG. 9, below, feedback, such as a phase-lock-loop, may be employed to generate and/or apply the excitation signal and observe the response thereto.

The subroutine 800 proceeds to 806. At 806, the control system 102 starts a timer, such as the timer 108 illustrated in FIG. 1A. The subroutine 800 proceeds to 808. At 808, the control system 102 monitors data indicative of a response to the excitation signal. The control system 102 may store the data indicative of a response to the excitation signal in the memory 106. The subroutine 800 proceeds to 810. At 810 the control system 102 increments the timer 108. The subroutine 800 proceeds to 812.

At 812, the control system 102 determines whether the timer has exceeded a threshold, such as a threshold length of time since the timer was started. If it is determined at 812 that the timer has not exceeded the threshold, the subroutine 800 proceeds from 812 to 808. If it is determined at 812 that the timer has exceeded the threshold, the subroutine 800 proceeds from 812 to 814.

At 814, the control system 102 determines whether the monitored data is consistent with a correct estimated polarity of the rotor. The control system 102 may employ a look-up table to determine whether the monitored data is consistent with a correct polarity of the rotor. If it is determined that the monitored data is consistent with a correct polarity, the subroutine 800 proceeds from 814 to 816. At 816, the control system 102 sets an indication that the estimated polarity of the rotor is correct. The subroutine 800 proceeds from 816 to 820.

If it is determined at 814 that the monitored data is not consistent with a correct polarity, the subroutine 800 proceeds from 814 to 818. At 818, the control system 102 sets an indication that the polarity of the rotor is incorrect. The subroutine 800 proceeds from 818 to 820.

At 820, the control system 102 discontinues the excitation signal. The subroutine 800 proceeds from 820 to 822. At 822, the subroutine returns the value of any desired variables, such as a variable indicating whether the polarity of the rotor is correct.

Embodiments of a subroutine to determine the polarity of a rotor may perform other acts not shown in FIG. 8, may not all perform all of the acts shown in FIG. 8, or may perform the acts of FIG. 8 in a different order. For example, in some embodiments the subroutine 800 may be modified so that the monitoring of the data indicative of the impact of the excitation signal occurs after the timer threshold is exceeded. In another example, the subroutine 800 could be modified to modify the polarity of the estimated position of the rotor at act 818, instead of setting an indication that the polarity is incorrect.

FIG. 9 is a function block diagram of a system 900 employing feedback and illustrated in the form of a Luenberger observer model. An input signal indicative of an estimated position $θ_E$ of a rotor (see rotor 128 in FIG. 1A) is applied to a positive input 902 of a first adder 904. A negative input 906 of the first adder 904 receives a feedback signal indicative of any change in the estimated position $θ_E'$ of the rotor. The output 908 of the first adder 904 is coupled to an input 910 of a first integrator 912 and to an input 914 of a stiffness gain block 916. An output 918 of the first integrator 912 is coupled to an input 920 of an integral gain block 922.

The signal indicative of an estimated position $θ_E$ is also applied to an input 924 of a first differentiator 926. An output 928 of the first differentiator 926 is coupled to a positive input 930 of a second adder 932. A negative input 934 of the second adder 932 receives a feedback signal indicative of an estimated average velocity $ω_{EAV}$ of the rotor. An output 936 of the second adder 932 is coupled to an input 940 of a damping gain block 942.

An output 944 of the integral gain block 922 is coupled to a first positive input 946 of a third adder 948. An output 950 of the stiffness gain block 916 is coupled to a second positive input 952 of the third adder 948. An output 954 of the damping gain block 942 is coupled to a third positive input 956 of the third adder 948.

The first adder 904, the first integrator 912, the stiffness gain block 916, the integral gain block 922, the first differentiator 926, the second adder 932, the damping gain block 942 and the third adder 948 correspond to a proportional and integral controller 957.

The output 958 of the third adder 948 is coupled to a first positive input 960 of a fourth adder 962. A second positive input 964 of the fourth adder 962 receives a commanded torque signal $T_M$.

An output 966 of the fourth adder 962 is coupled to an input 968 of an inertia gain block 970. An output 972 of the inertia gain block 970 is coupled to an input 974 of a second integrator 976. An output 978 of the second integrator 976 is coupled to an input 980 of an averager 982. An output 984 of the averager 982 is coupled to an input 986 of a third integrator 988. The inertia gain block 970, the second integrator 976, the averager 982 and the third integrator 988 represent the behavior of the motor (see motor 126a in FIG. 1A). The output 972 of the inertia gain block 970 corresponds to an estimated acceleration $\alpha_E$ of the rotor. The output 978 of the second integrator 976 corresponds to an estimated velocity $\omega_E$ of the rotor. The output 984 of the averager 982 is also coupled to the negative input 934 of the second adder 932 and corresponds to an estimated average velocity $\omega_{EAV}$ of the rotor. The output 990 of the third integrator 988 is coupled to the negative input 906 of the first adder 904 and corresponds to a new estimated position $\theta_E'$ of the rotor.

Operation of the system 900 illustrated in FIG. 9 will be discussed in the context of a motor vehicle. The torque command signal $T_M$ comprises a rotor polarity detection component. If the vehicle is stopped, the torque command signal $T_M$ may consist of the rotor polarity detection signal. If the polarity of the rotor in the estimated position $\theta_E$ of the rotor is correct, the signal -$T_D$ present at the output 958 of the third adder 948 will have no error or disturbance torque component. If the polarity of the rotor in the estimated position $\theta_E$ of the rotor is incorrect, the signal -$T_D$ present at the output 958 of the third adder 948 will have a detectable disturbance torque component.

If the vehicle is moving, the torque command signal $T_M$ may have other components in addition to the rotor polarity detection signal, or it may consist of the rotor polarity detection signal. If the polarity of the rotor in the estimated position $\theta_E$ of the rotor is correct, the signal -$T_D$ present at the output 958 of the third adder 948 will have no error or disturbance torque component at the frequency of the rotor polarity detection component of the commanded torque $T_M$. If the polarity of the rotor in the estimated position $\theta_E$ of the rotor is incorrect, the signal -$T_D$ present at the output 958 of the third adder 948 will have a larger component at a frequency similar to the frequency of the rotor polarity detection component of the commanded torque $T_M$. If the torque command signal has components other than the rotor polarity detection signal, for example a component based on a desired torque, the rotor polarity detection signal component and the component based on a desired torque may be sychronized.

Embodiments of the disclosed methods, apparatus and articles may be represented using different physical models. Different forms of closed loop systems may be employed and may have different inputs. For example, estimated position and estimated velocity may be employed in the feedback loops instead of estimated position and estimated average velocity. Different or additional damping terms, for example, friction damping, may be taken into account in the model. The system 900 of FIG. 9 may be implemented in software or hardware.

Figure 10:
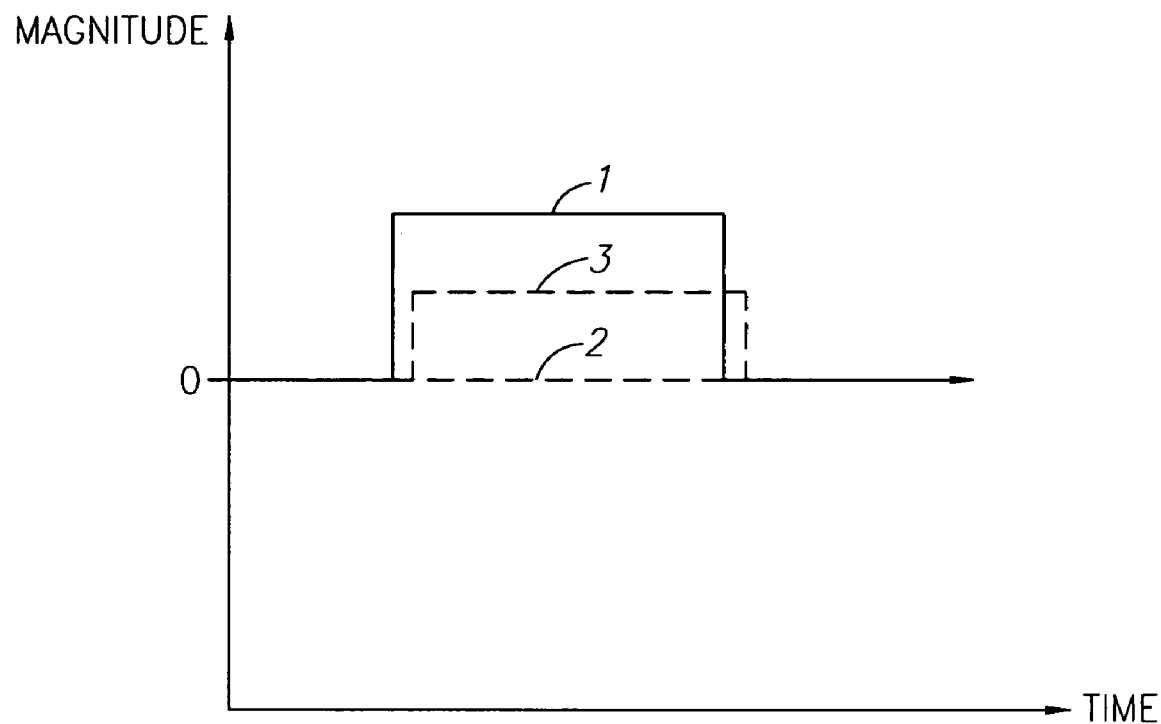
FIG. 10 is a graph illustrating responses to a rotor polarity detection signal.

FIG. 10 is a graphical representation of a single pulse rotor polarity detection signal 1 suitable for use, for example, when a vehicle is stationary. If the polarity is correct, a distortion signal, represented by the curve 2, will be negligible. If the polarity is incorrect, the distortion signal, represented by the curve 3, will be detectable. The magnitude of the distortion signal may be greater than, equal to, or less than, the magnitude of the rotor polarity detection signal and may be shifted in time.

Figure 11:
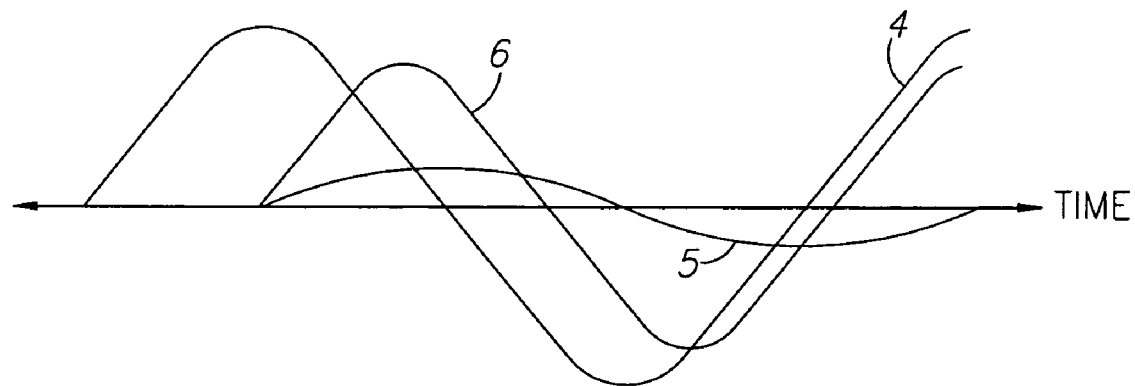
FIG. 11 is another graph illustrating responses to a rotor polarity detection signal.

FIG. 11 is a graphical representation of a sinusoidal rotor position detection signal 4 suitable for use, for example, when a vehicle is in motion. The sinusoidal rotor position detection signal 4 also is suitable for use when a vehicle is stationary. If the polarity is correct, a distortion signal, represented by the curve 5, will be negligible and at the same frequency as the rotor position detection signal. The distortion signal 5 may be, as illustrated, shifted in phase from the rotor position detection signal. If the polarity is incorrect, the distortion signal, represented by the curve 6, will be detectable and at a frequency similar to the frequency of the rotor position detection signal. The magnitude of the distortion signal illustrated by the curve 6 may be greater than, equal to, or less than, the magnitude of the rotor polarity detection signal and may be shifted in time.

Source code based on FIGS. 1A-11 and the detailed description provided herein can be readily generated by one of skill in the art.

The term "computer-readable medium" as used herein refers to any medium that participates in providing instructions to a system, such as the control system 102 illustrated in FIG. 1A, or a processor for execution. Such a medium may take many forms, including but not limited to, non-volatile media, volatile media, and transmission media. Non-volatile media includes, for example, hard, optical or magnetic disks. Volatile media includes dynamic memory, such as the memory 106 illustrated in FIG. 1A. Transmission media includes coaxial cables, copper wire and fiber optics. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM and an EEPROM, a FLASH-EPROM, any other memory chip or cartridge, a carrier wave, or any other medium from which a computer can read.

Various forms of computer readable media may be involved in carrying one or more sequences of one or more instructions to a processor for execution. For example, the instructions may initially be carried on a magnetic disk of a remote computer. The remote computer can load the instructions into its dynamic memory and send the instructions over a telephone line using a modem. A modem local to computer system can receive the data on the telephone line and use an infrared transmitter to convert the data to an infrared signal. An infrared detector coupled to a system bus can receive the data carried in the infrared signal and place the data on system bus. The system bus carries the data to system memory, from which a processor retrieves and executes the instructions. The instructions received by system memory may optionally be stored on storage device either before or after execution by the processor.

Although specific embodiments of and examples for the present system, method and article for detecting the position of a rotor are described herein for illustrative purposes, various equivalent modifications can be made without departing from the spirit and scope of the disclosure, as will be recognized by those skilled in the relevant art after reviewing the specification.

The various embodiments described above can be combined to provide further embodiments. All of the U.S. patents, U.S. patent application publications, U.S. patent applications, foreign patents, and foreign patent applications referred to in this specification and/or listed in the Application Data Sheet, including but not limited to: commonly assigned U.S. patent application Ser. No. 10/345,872 filed Jan. 15, 2003, and entitled "OVERMODULATION SYSTEMS AND METHODS FOR INDUCTION MOTOR CONTROL", now U.S. Pat. No. 6,844,701, issued Jan. 18, 2005; commonly assigned U.S. patent application Ser. No. 10/208,251 filed Jul. 29, 2002 and entitled "METHOD AND APPARATUS FOR HIGH PERFORMANCE PERMANENT MAGNET MOTOR SPEED CONTROL WITH LIMITED POSITION INFORMATION", now U.S. Pat. No. 6,700,342, issued on Mar. 2, 2004; commonly assigned U.S. patent application Ser. No. 10/346,724 filed Jan. 16, 2003 and entitled "CIRCUIT CONFIGURATION FOR PERMANENT MAGNET SYNCHRONOUS MOTOR CONTROL", now U.S. Pat. No. 6,894,450, issued on May 17, 2005; and commonly assigned U.S. patent application Ser. No. 10/449,824 filed May 30, 2003 and entitled "METHOD AND APPARATUS FOR MOTOR CONTROL", now U.S. Pat. No. 6,936,991, issued on Aug. 30, 2005. Aspects of the embodiments described herein can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification. Accordingly, the claims are not limited by the disclosure.

The invention claimed is:

1. A system, comprising:
a sensor to sense data indicative of a rotor position; and
a rotor position estimator communicatively coupled to the sensor and configured to:
receive a first set of data indicative of a position of a rotor from the sensor;
generate a rotor position detection signal comprising a plurality of torque command pulses;
receive a second set of data indicative of the position of the rotor from the sensor; and
determine a polarity of the rotor based at least in part on the first and second sets of data.

2. The system of claim 1 wherein the plurality of torque command pulses comprise at least a positive torque command pulse.

3. The system of claim 1 wherein the rotor position detection signal comprises a periodic signal.

4. The system of claim 3 wherein the rotor position detection signal comprises a sinusoidal signal.

5. The system of claim 1 wherein the rotor position estimator is configured to determine the polarity of the rotor by determining a direction of movement of the rotor in response to the rotor position detection signal based at least in part on the first and second sets of data.

6. The system of claim 1 wherein the sensor is configured to sense a current.

7. The system of claim 1 wherein the sensor is configured to a sense voltage.

8. The system of claim 1 wherein the rotor position estimator comprises a lookup table.

9. The system of claim 1 wherein the rotor position estimator comprises a feedback loop.

10. An alternating current machine comprising:
a rotor;
a stator;
means for sensing; and
means for controlling and alternating current machine comprising:
means for generating torque current control signals comprising a plurality of torque command pulses;
means for generating flux current control signals; and
means for estimating a position of the rotor with respect to the stator comprising:
means for verifying a polarity of the rotor including a communicative coupling connected to said means for sensing configured to receive a first set of data indicative of the rotor position and a second set of data indicative of the rotor position, wherein the means for verifying determines polarity of the rotor based at least in part on the first and second sets of data.

11. The alternating current machine of claim 10 wherein the means for sensing is configured to sense an indication of an angular position of the rotor with respect to the stator.

12. The alternating current machine of claim 11 wherein the means for sensing is configured to sense an indication of a current.

13. The alternating current machine of claim 10 wherein the means for verifying a polarity of the rotor comprises means for generating a torque command pulse.

14. The alternating current machine of claim 10 wherein the means for verifying a polarity of the rotor comprises means for generating a polarity detection signal.

15. The alternating current machine of claim 14 wherein the means for generating a polarity detection signal is configured to generate a sinusoidal signal.

16. The alternating current machine of claim 14 wherein the means for verifying a polarity of the rotor is configured to determine the polarity of the rotor by determining a direction of movement of the rotor in response to the polarity detection signal.

17. The alternating current machine of claim 14 wherein the means for verifying a polarity of the rotor is configured to determine the polarity of the rotor by detecting an error signal.

18. The alternating current machine of claim 10 wherein the means for verifying a polarity of the rotor comprises a feedback loop.

19. The alternating current machine of claim 10 wherein the means for verifying a polarity of the rotor comprises a lookup table.

20. A method of determining a polarity of a rotor in an alternating current machine, the method comprising:
estimating a position of the rotor;
applying a first rotor polarity detection signal;
sensing data indicative of a response to the first rotor polarity detection signal by at least detecting a magnitude of a disturbance torque signal;
applying a second rotor polarity detection signal;
sensing data indicative of a response to the second rotor polarity detection signal; and
determining a polarity of the rotor based at least in part on a first and second sensed data set indicative of a response to the first and second rotor polarity detection signals.

21. The method of claim 20 wherein sensing data indicative of a response to the rotor polarity detection signal comprises sensing data indicative of a direction of the movement of the rotor.

22. The method of claim 20 wherein sensing data indicative of a response to the rotor polarity detection signal comprises detecting a frequency of an error signal.

23. The method of claim 20 wherein sensing data indicative of a response to the rotor polarity detection signal comprises detecting a frequency and magnitude of an error signal.

24. The method of claim 20, further comprising:
adjusting the estimated position of the rotor based at least in part on the determined polarity of the rotor.

25. The method of claim 24 wherein adjusting the estimated position of the rotor comprises adding a position offset to the estimated position of the rotor.

26. The method of claim 25 wherein the position offset is 180 degrees.

27. The method of claim 20 wherein the rotor polarity detection signal comprises a torque command component.

28. The method of claim 20 wherein the rotor polarity detection signal comprises a periodic signal.

29. The method of claim 28 further comprising:
synchronizing the rotor polarity detection signal and a torque command signal.

30. The method of claim 20 wherein the estimated position of the rotor is a function of time.

31. The method of claim 20 wherein said disturbance torque signal comprises a signal representing the quantity of disturbance torque within said alternating current machine.

32. A computer-readable medium storing instructions for causing control system to determine a polarity of a rotor by:
estimating a position of the rotor;
applying a first rotor polarity detection signal;
sensing data indicative of a response to the first rotor polarity detection signal by at least detecting a magnitude of a disturbance torque signal;
applying a second rotor polarity detection signal;
sensing data indicative of a response to the second rotor polarity detection signal; and
determining a polarity of the rotor based at least in part on a first and second sensed data set indicative of a response to the first and second rotor polarity detection signals.

33. The computer-readable medium of claim 32 wherein the stored instructions further cause the control system to:
adjust the estimated position of the rotor based at least in part on the determined polarity of the rotor.

34. The computer readable medium of claim 32 wherein said disturbance torque signal comprises a signal representing the quantity of disturbance torque within a system.

* * * * *